Figure 4:
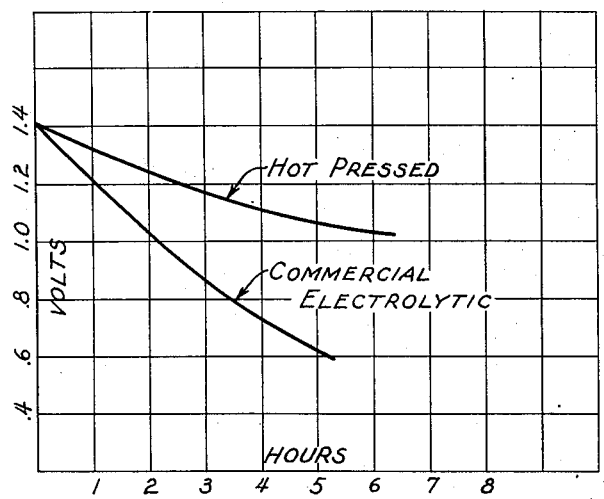

April 1, 1952 A. L. FOX 2,591,532
DEPOLARIZER FOR PRIMARY CELLS
Filed Feb. 1, 1950 3 Sheets-Sheet 1
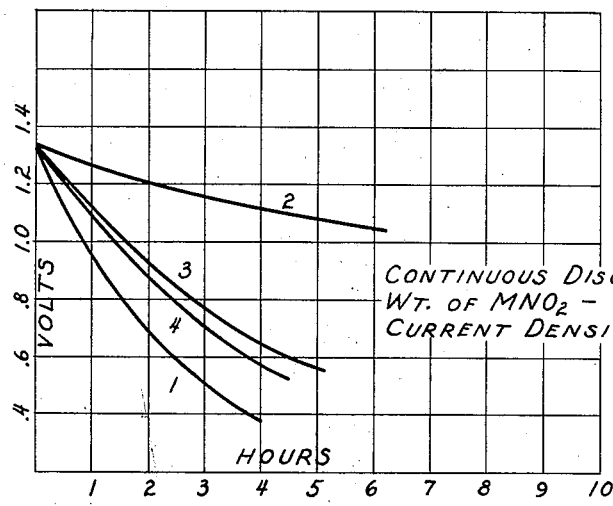
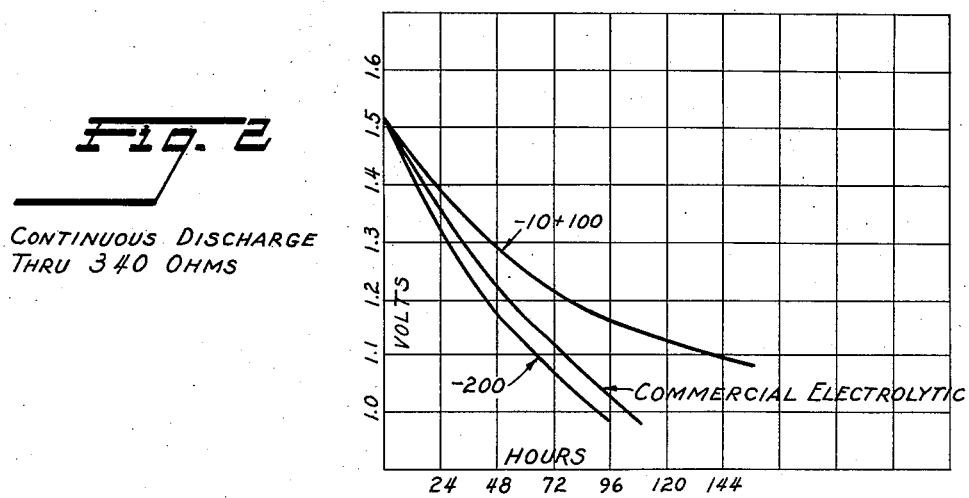
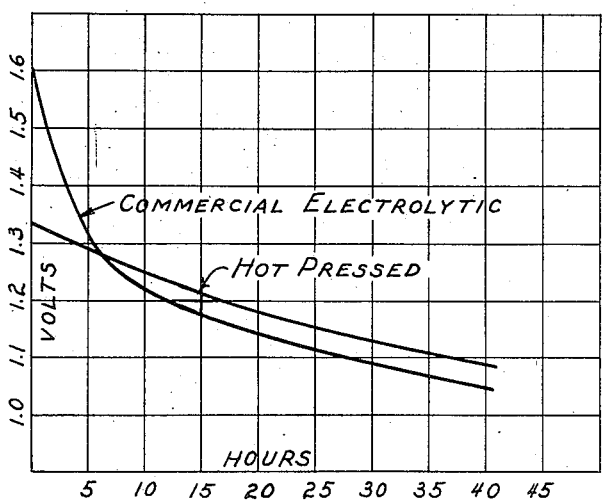
INVENTOR
Abraham L. Fox April 1, 1952 A. L. FOX 2,591,532
DEPOLARIZER FOR PRIMARY CELLS
Filed Feb. 1, 1950 3 Sheets-Sheet 2

CONTINUOUS DISCHARGE
AT 50 MA.

CONTINUOUS DISCHARGE
THRU 340 OHMS

CONTINUOUS DISCHARGE
THRU 58 OHMS

INVENTOR
Abraham L. Fox

April 1, 1952　　　A. L. FOX　　　2,591,532
DEPOLARIZER FOR PRIMARY CELLS
Filed Feb. 1, 1950　　　3 Sheets-Sheet 3
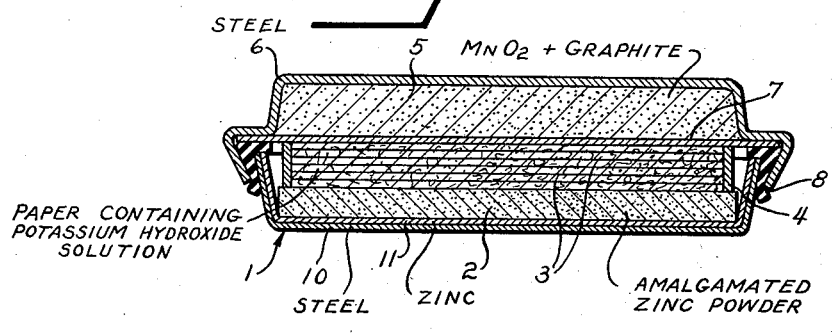
INVENTOR
ABRAHAM L. FOX
by Reginald S Dean
AGENT Patented Apr. 1, 1952

2,591,532

UNITED STATES PATENT OFFICE 2,591,532

DEPOLARIZER FOR PRIMARY CELLS

Abraham L. Fox, Washington, D. C., assignor to Manganese Battery Corporation, Riverdale, Md., a corporation of Delaware Application February 1, 1950, Serial No. 141,813

7 Claims. (Cl. 136—138)

This invention relates to depolarizers for primary cells. It relates particularly to such depolarizers containing as their active ingredient manganese dioxide. It has for its aim the provision of such depolarizers permitting larger currents to be withdrawn without polarization and also having higher current capacity per unit of volume.

To obtain high current capacity it has been the practice in the prior art to grind the manganese dioxide very fine and mix it with fine carbon to obtain the necessary conductivity. The activity of such a mixture resides at the interface of the carbon and manganese dioxide and the contact resistance at this interface is a factor in determining the depolarization rate and, hence, the current which can be drawn. This contact resistance cannot be decreased by adding more carbon, although the resistance of the depolarizing mass from electrolyte to external contact can be so decreased.

This situation has made it necessary to use manganese dioxide-carbon depolarizers at relatively low current density per unit of surface exposed to the electrolyte. Many means have been proposed to overcome this difficulty, such as compressing the manganese dioxide-carbon mixture, but none of these means have been entirely successful. I have found that if the depolarizing mass be composed of relatively coarse particles of highly conducting manganese dioxide having good depolarizing properties, completely surrounded by a good conducting carbon, such as graphite, that high currents may be drawn with good current capacity.

I will shortly illustrate by examples the improvement which I obtain by the practice of my invention. I wish to explain first, however, what I mean by "highly conducting manganese dioxide having good depolarizing properties."

The literature contains many measurements of the electrical resistance of manganese dioxide. The lowest of such measurements which I have seen are more than 100 ohms per cm.$^3$ at 20° C. Material of much higher resistance has frequently been described in the patent literature as "good conducting." I want to make it entirely clear that such material is not at all suitable for my invention, which requires resistance of less than 100 ohms per cm.$^3$ at 20° C.

In the preferred form of my invention I use manganese dioxide having a resistance of less than 10 ohms per cm.$^3$ at 20° C. A limiting resistance for the practice of my invention arises from the fact that with material of relatively high resistance, such as commercial battery oxides having resistances of 4,000 to 100,000 ohms per cm.$^3$, higher capacities are obtained with finer grinding. With material having a resistance of less than 10 ohms per cm.$^3$, such as preferred for my invention, higher capacities are obtained with coarser particles. At some intermediate resistance these two tendencies balance and the advantage of low resistance particles, distributed like raisins in a cake, is lost. This resistance is reached at about 100 ohms per cm.$^3$ which is, therefore, the upper limit for the effective practice of my invention. The advantages of my invention, however, become sharply more pronounced when the particles have a resistance of less than 10 ohms per cm.$^3$.

It is not sufficient that the particles of manganese dioxide for my invention have low electrical resistance, they must also have good depolarizing power. To insure this I find that the manganese dioxide must have a so-called gamma structure as determined by X-ray spectrometry. It must also have a manganese-oxygen ratio of at least $MnO_{1.80}$ but more than 1.96.

A practical test of the suitability of conducting manganese dioxide particles for my invention is to grind them to the conventionally fine size and compare their performance in a standard Le Clanche cell with African battery grade ore. The comparison must be favorable to the finely ground conducting particles.

Such material may be produced by pressing at elevated temperature, as disclosed in my copending application, Serial No. 66,140, dated December 18, 1948, which has has been abandoned. For example, I press commercial electrolytic manganese dioxide, which has the gamma structure and analysis required, under a pressure of 25 tons per square inch at 600° F. until on releasing the pressure and cooling to 20° C. the specific electrical resistance of the pellet is less than 10 ohms per cm.$^3$. I have found that temperatures from 450° F. to 650° F. and pressures from 10 to 50 tons per square inch may be used to produce a product suitable for my invention.

To make such material useful for my invention it is broken up and sized by screening or other conventional means. Particles which will pass an 8-mesh screen but not a 200-mesh screen are suitable for my invention. Undersized particles may be again compacted by pressing at elevated temperature and broken for further sizing.

Figure 5:
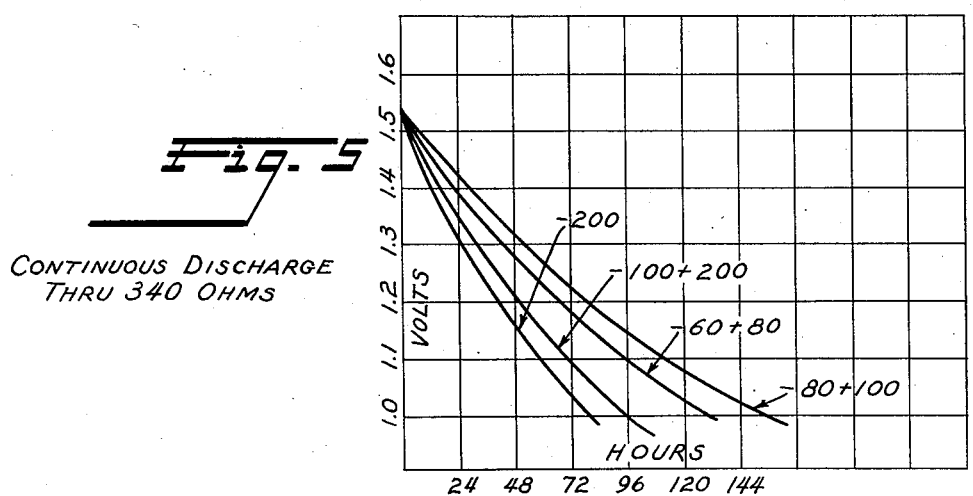
Figure 6:
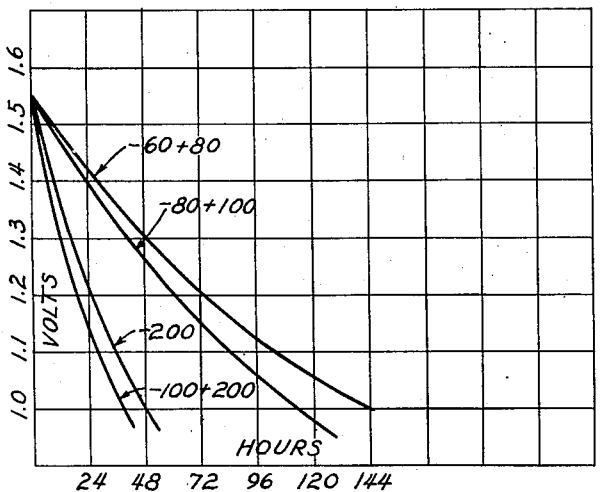

In the accompanying drawings, Fig. 1 shows discharge curves of alkaline cells using depolarizing cathodes embodying the improvement of the invention; Figures 2, 3 and 4 show discharge curves comparing cells using embodiments of the invention and same cells using a commercial electrolytic manganese dioxide; Figures 5 and 6 show comparable discharge curves for cells using embodiments of the invention at low and high current drainage, respectively; Fig. 7 is a vertical cross-sectional view of one type of cell to which the invention is applicable.

Figure 1 illustrates the factors whose co-action produce the improvement of my invention. In this figure are shown discharge curves of alkaline cells having a zinc anode and a depolarizing cathode of the same weight in each case made up from (1) particles of African battery grade manganese dioxide ore through 80- on 100 mesh with 10% graphite, (2) particles of hot pressed manganese dioxide having a specific electrical resistance at 20° C. of 40 ohms, through 80- on 100 mesh with 10% graphite, (3) -200 mesh particles of the same hot pressed manganese dioxide used in (2) mixed with 10% graphite, (4) one-half inch pieces of the hot pressed manganese dioxide used in (2) mixed with 10% graphite. The curves in the figure are identified by the numbers just given for the several varieties of manganese dioxide.

My invention is valuable not only in permitting higher currents to be drawn from primary cells but also in increasing the density of the cell contents and the proportion of manganese dioxide in them. This gives greater current capacity in a given volume.

The conducting manganese dioxide particles or masses in the size range 8 to 200 mesh may be produced in other ways than by the comminution of hot pressed pellets. They may be formed directly, for example, by rolling the heated material through hot dimpled rolls. For this process I have found that to have the necessary low resistance of less than 10 ohms per cm.$^3$ in the particles the manganese dioxide which is used must have a specific resistance of less than 6000 ohms when compacted under 10 tons per square inch at room temperature. This test is a convenient one to determine whether a particular sample of manganese dioxide is suitable for my process. The suitability can also be determined by analysis and X-ray examination. Analysis should show 86% to 92% $MnO_2$, 2% to 4% $MnO$, balance substantially all water with not more than 0.2% of other impurities. X-ray analysis should show the gamma structure characteristic of commercial electrolytic manganese dioxide.

*Example 1*

I take manganese dioxide which has been made in accordance with my co-pending application, Serial No. 65,540, filed December 15, 1948; that is, by the oxidation of fully crystalline manganese carbonate, having a crystal size of 1 to 2 microns in diameter, at 560° F. until it analyses 80% manganese dioxide. I leach this with 10% sulphur acid and wash with hot water until the pH of the wash water is 5.5. This material is dried at 105° C. Its analysis is

| | |
|---|---|
| $MnO_2$ | 88.8 |
| Total Mn | 60.8 |
| Moisture | 4.7 |
| Iron | 0.2 |

Pressed at room temperature at 10 tons per square inch its specific electrical resistance is 4000 ohms per cm.$^3$. I take this material and subject it to a pressure of 25 tons per square inch at 600° F. until its specific resistance measured at 20° C. is 4.0 ohms per cm.$^3$. The pellet made in this way is broken up and sized by screening. A product passing a 10-mesh but not a 100-mesh screen was used for the preparation of a Le Clanche cell as follows:

The manganese dioxide was mixed with 2% by weight of Shawinigan black. Moistened with standard Le Clanche electrolyte and packed into a starch coated zinc can. For comparison the same hot pressed manganese dioxide was crushed through 200-mesh, mixed with 2% Shawinigan black, and made into a cell in the same way. Likewise, commercial electrolytic manganese dioxide was mixed with 2% Shawinigan black and made into a comparable cell. The discharge curves of these cells are shown in Figure 2.

*Example 2*

I take commercial electrolytic manganese dioxide having the following analysis: 91.2% $MnO_2$, 3.4% $MnO$, 5.4% $H_2O$. This material when pressed at room temperature at 10 tons per square inch had a specific electrical resistance of 6000 ohms per cm.$^3$. This material is heated to 650° F. and pressed by passing through dimpled rolls at 600° F. The resulting product had the following sieve analysis:

| Through Mesh | On Mesh | Per cent |
|---|---|---|
| 8 | 20 | 5 |
| 20 | 48 | 10 |
| 48 | 100 | 65 |
| 100 | 200 | 18 |
| 200 | -- | 2 |

Specific electrical resistance at 20° C. determined on the larger pieces was 6.5 ohms per cm.$^3$. This material was made into alkaline cells as follows:

Five grams of the product was mixed with 10% finely divided graphite and pressed at 2000 pounds per square inch into an iron can. The resulting compact had a surface area of ¾ square inch. The electrolyte used was 75 grams of KOH, 100 cc. of $H_2O$, 10 grams of ZnO. A pressed pellet of amalgamated zinc granules was used as an anode. Figure 7 illustrates one method of construction of such a cell but it will be understood that the structure illustrated is conventional and that the present invention is applicable to many conventional cell structures.

In Figure 7 the container 1 is formed from a zinc-steel bimetal, comprising an external steel layer 10 and an internal zinc layer 11. The thickness of each metal being approximately the same. The anode 2 which rests upon and makes contact with the zinc side of the container is a compressed pellet of amalgamated zinc powder containing about .05% lead and about .002% cadmium. Spacer 3, housed in polystyrene ring 4 is composed of six discs of .010″ thick Dexter paper, a porous high purity paper, impregnated with an electrolyte solution made by dissolving 80 grams of potassium hydroxide in 100 ml. of water. The concentration may be varied within the range of 30 to 100 grams of potassium hydroxide to 100 ml. of water. After impregnation the spacer is drained of free-flowing electrolyte.

The cathode-depolarizer 5 consists of a compressed pellet 90% by weight of manganese dioxide which will pass a standard sieve having 40 meshes and remain on one having 60 meshes to the linear inch and 10% micronized graphite housed within steel can top 6 with which it makes contact. A three mil thick disc 7 of plasticized polyvinyl alcohol is interposed between spacer 3 and cathode 5 and acts as a barrier to prevent migration of deleterious particles. The bimetal zinc steel container and the steel can top which serve as terminals of the cell are insulated from each other by neoprene grommet ring 8 of L-shaped cross-section which rests on the container and against which the top is spun down so as to seal the cell. In the assembly of the cell the paper spacer is compressed about 10% to allow adequate continuous contact. The cells were discharged at high and low current drain. For the low current drain they were discharged through 130 ohms; for high current drain a constant current of 50 milliamperes was used. For comparison the same cells were made using commercial electrolytic manganese dioxide in accordance with the usual practice. The discharge curves for these cells at low drain are shown in Figure 3 and at high drain in Figure 4.

The advantages of my invention are more apparent at high drain; however, in evaluating the results shown in Figure 3 it should be pointed out that they are for constant weight of manganese dioxide. The volume of the depolarizing mass is considerably less when made in accordance with my invention.

*Example 3*

In this example I use manganese dioxide and cells prepared in accordance with Example 1. I have, however, varied the amount of Shawinigan black mixed with the sized manganese dioxide in an attempt to obtain approximately comparable discharge curves at a comparatively low current drain. The cells were made up as follows:

| Size $MnO_2$ | Per cent Shawinigan Black | Weight Cell Contents |
|---|---|---|
| | | *Grams* |
| −200 | 20 | 10 |
| −200+100 | 10 | 8 |
| −100+80 | 5 | 6 |
| −80+60 | 2 | 5 |

The cell cans are completely filled with depolarizer, moistened with standard Le Clanche electrolyte. The total weight of the cell content is shown in the table. The discharge curves through 340 ohms are shown in Figure 5. Discharge curves for the same cells through 58 ohms are shown in Figure 6.

It will be clear that while satisfactory discharge curves can be obtained from fine sizes at low drains by increasing the carbon, this is not so for higher drains.

*Example 4*

I take manganese dioxide like that of Example 1 and compact it at 580° F. and 30 tons per square inch into pellets $\frac{1}{16}$ inch in diameter. These pellets have an electrical resistance of 9.2 ohms per cm.$^3$ at 20° C. I mix these pellets with 5% Shawinigan black and use this mixture to prepare a bobbin for a primary cell using a magnesium can as anode and an aqueous solution of 30% lithium bromide plus 2% ammonium chromate as electrolyte. A cell made in this way will deliver its capacity at twice the current drain which could be used with a bobbin prepared from standard African ore and 10% Shawinigan black.

The practice of my invention has been illustrated with several types of primary cells. Depolarizers prepared in accordance with my invention may be advantageous used in any cell where manganese dioxide carbon mixtures prepared in the usual way are used.

What is claimed is:

1. A depolarizing electrode for a primary cell consisting of particles of synthetic gamma manganese dioxide, having a manganese-oxygen ratio of $MnO_{1.80}$ to $MnO_{1.96}$, and having an electrical resistivity at 20° C. between 4 ohms and 100 ohms per cm.$^3$, said particles being of such size as to pass a standard sieve having 8 meshes and remain on one having 200 meshes to the linear inch and being distributed uniformly throughout a porous matrix of carbon.

2. The article of claim 1 further characterized by the matrix, consisting of finely divided graphite and constituting from 2 to 10% of the weight of the manganese dioxide particles.

3. The article of claim 1 further characterized by the particles having an electrical resistivity between 4 ohms and 10 ohms per cm.$^3$ and the particles being of such size as to pass a standard sieve having 40 meshes and remain on one having 150 meshes to the linear inch.

4. The method of preparing a depolarizing electrode for primary cells which consists in the steps of compacting gamma manganese dioxide, having a manganese-oxygen ratio from $MnO_{1.80}$ to $MnO_{1.96}$ at a temperature of 450° to 650° F. and a pressure of 10 to 50 tons per square inch, cooling said manganese dioxide compact and comminuting it to particles passing a standard sieve having 10 meshes and remaining on one 100 meshes to the linear inch, mixing said particles uniformly with carbon of much finer size and compacting to form a depolarizing electrode.

5. The method of preparing a depolarizing electrode for primary cells which consists in the steps of compacting synthetic manganese dioxide, having a manganese-oxygen ratio of from $MnO_{1.80}$ to $MnO_{1.96}$ into masses which will pass a standard sieve having 10 meshes and remain on one having 100 meshes to the linear inch by pressing at a temperature between 450° to 650° F. whereby to give them an electric resistivity at 20° C. of between 4 and 10 ohms per cm.$^3$, mixing said conducting masses of manganese dioxide with from 1% to 20% by weight of finely divided carbon, forming into mass having an external electrical contact whereby to form an electrode for a primary cell.

6. The method of preparing a depolarizing electrode having increased density which consists in mixing from 2% to 5% by weight of very finely divided carbon with particles of gamma manganese dioxide, having a manganese-oxygen ratio of from $MnO_{1.80}$ to $MnO_{1.96}$, said particles being of a size which will pass a standard sieve having 10 meshes and remain on one having 100 meshes to the linear inch, and having an electrical resistivity of 4 to 10 ohms per cm.$^3$, and compacting the mixture against a solid carbon contact member.

7. A primary cell consisting of a metallic anode and an electrolyte in which the anode dissolves electrochemically and a depolarizer consisting of finely divided carbon and particles of manganese dioxide passing a standard sieve having 20 meshes and remain on one having 200 meshes to the linear inch, having an electrical resistivity of 4–10 ohms per cm.$^3$, said particles being of such character that when ground to pass a standard screen having 200 meshes to the linear inch depolarizing properties when used in a Le Clanche cell at least as good as standard African ore.

ABRAHAM L. FOX.

REFERENCES CITED

The following references are of record in the file of this patent:

UNITED STATES PATENTS

| Number | Name | Date |
|---|---|---|
| 1,305,251 | Burgess | June 3, 1919 |
| 1,322,001 | Ellis | Nov. 18, 1919 |
| 1,484,782 | Heise | Feb. 26, 1924 |
| 2,458,878 | Ruben | Jan. 11, 1949 |

FOREIGN PATENTS

| Number | Country | Date |
|---|---|---|
| 25,784 | Great Britain | Nov. 9, 1912 |

OTHER REFERENCES

Copeland et al.: "Preparation of a Dry Cell Depolarizer by Air Oxidation of Manganous Hydroxide," Transactions of the Electro-Chemical Society, vol. 92, 1947, pages 127–132.